United States Patent
Funahara et al.

(10) Patent No.: US 12,264,457 B2
(45) Date of Patent: Apr. 1, 2025

(54) REMOTE OPERATION SYSTEM AND REMOTE OPERATION SERVER

(71) Applicant: KOBELCO CONSTRUCTION MACHINERY CO., LTD., Hiroshima (JP)

(72) Inventors: Yusuke Funahara, Hiroshima (JP); Hitoshi Sasaki, Hiroshima (JP); Yoichiro Yamazaki, Hiroshima (JP)

(73) Assignee: Kobelco Construction Machinery Co., Ltd., Hiroshima (JP)

(*) Notice: Subject to any disclaimer, the term of this patent is extended or adjusted under 35 U.S.C. 154(b) by 511 days.

(21) Appl. No.: 17/611,688

(22) PCT Filed: Apr. 9, 2020

(86) PCT No.: PCT/JP2020/016056
§ 371 (c)(1),
(2) Date: Nov. 16, 2021

(87) PCT Pub. No.: WO2020/250558
PCT Pub. Date: Dec. 17, 2020

(65) Prior Publication Data
US 2022/0316181 A1    Oct. 6, 2022

(30) Foreign Application Priority Data
Jun. 10, 2019   (JP) ................. 2019-108276

(51) Int. Cl.
*E02F 9/20*    (2006.01)
*E02F 9/26*    (2006.01)
(Continued)

(52) U.S. Cl.
CPC ............ *E02F 9/205* (2013.01); *E02F 9/2054* (2013.01); *E02F 9/261* (2013.01); *G06Q 10/06398* (2013.01); *G06Q 50/08* (2013.01)

(58) Field of Classification Search
CPC ......... E02F 9/205; E02F 9/2054; E02F 9/261; G06Q 10/06398; G06Q 50/08
See application file for complete search history.

(56) References Cited

U.S. PATENT DOCUMENTS 7,145,595 B2    12/2006  Yamane et al.
2002/0059320 A1    5/2002  Tamaru
(Continued)

FOREIGN PATENT DOCUMENTS

CN    108830453 A   * 11/2018   ....... G06Q 10/06393
JP    2001-292439 A    10/2001
(Continued)

OTHER PUBLICATIONS

Extended European search report dated May 13, 2022 issued in the corresponding EP Patent Application No. 20821983.2.

*Primary Examiner* — Thomas E Worden
*Assistant Examiner* — Christopher Scott
(74) *Attorney, Agent, or Firm* — Carrier, Shende & Associates P.C.; Joseph P. Carrier; Jeffrey T. Gedeon

(57) ABSTRACT

According to the remote operation system or a remote operation server 20 included in the remote operation system, a "communication resource allocation process" is performed according to the skill or the like of the operator to allocate communication resources to a plurality of remote operation devices 10. When the "environment information control process" is performed, a data amount of environment data is reduced such that a reduction in the information amount of one or a plurality of low environment information factors is greater than the reduction in the information amount of one or a plurality of high environment information factors (meaning the reduction in the information amount of the environment information due to a change in the environment information factor). The environment information control (Continued)

process is performed in different modes according to a difference in an allocation resource.

6 Claims, 13 Drawing Sheets

(51) Int. Cl.
  *G06Q 10/0639* (2023.01)
  *G06Q 50/08* (2012.01)

(56) References Cited

U.S. PATENT DOCUMENTS

2020/0234514 A1* 7/2020 Pestoni .................. G07C 5/008
2020/0348665 A1* 11/2020 Bhanushali .......... H04N 19/167
2023/0054373 A1* 2/2023 Brooks ................. G07C 5/008

FOREIGN PATENT DOCUMENTS

| | | |
|---|---|---|
| JP | 2003-076978 A | 3/2003 |
| JP | 2008-146292 A | 6/2008 |
| JP | 2017-092908 A | 5/2017 |
| WO | 2019/012988 A1 | 1/2019 |

* cited by examiner

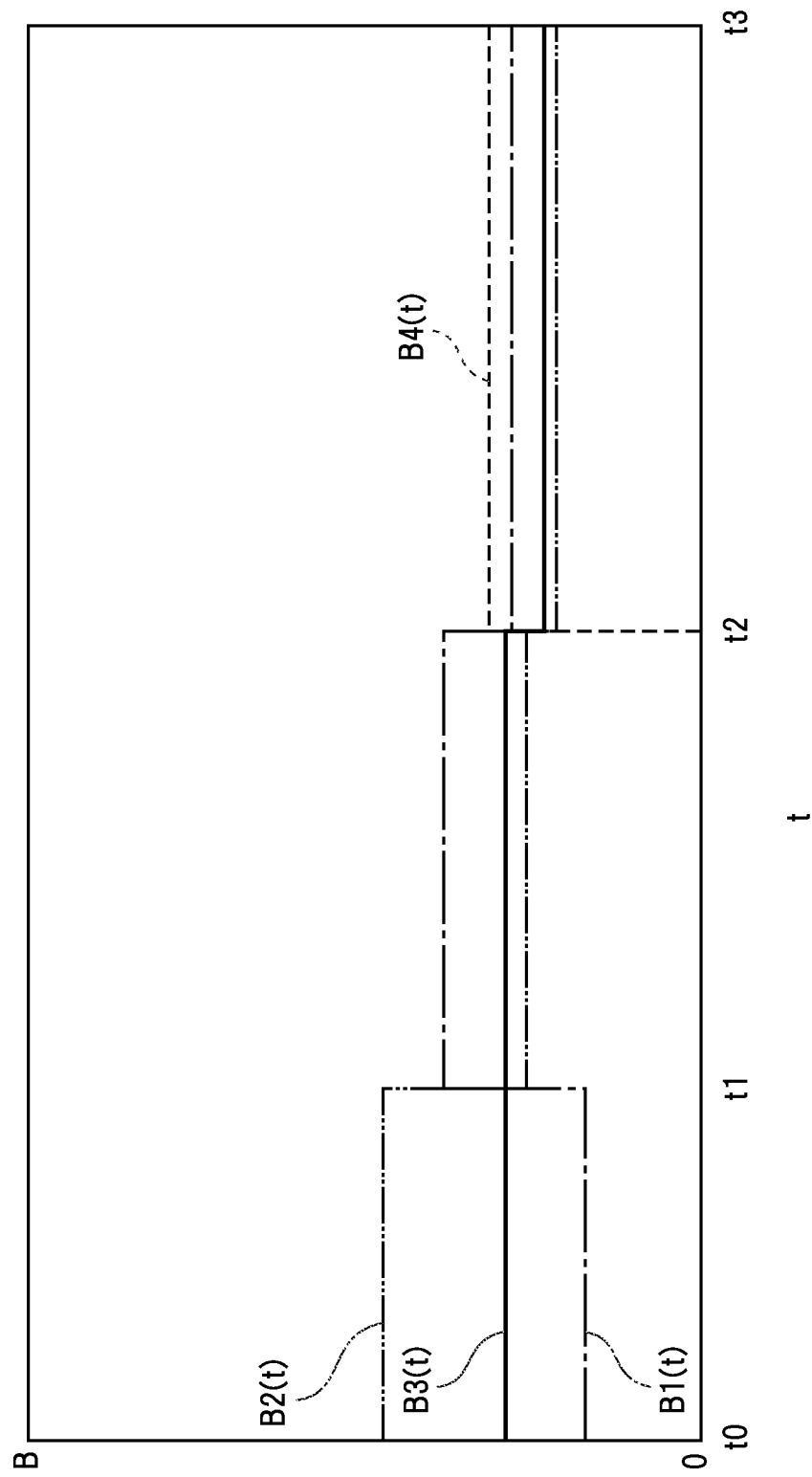

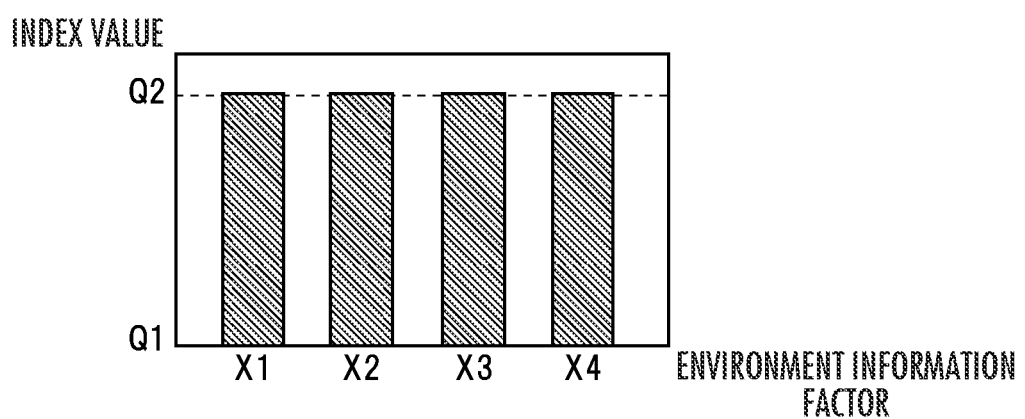

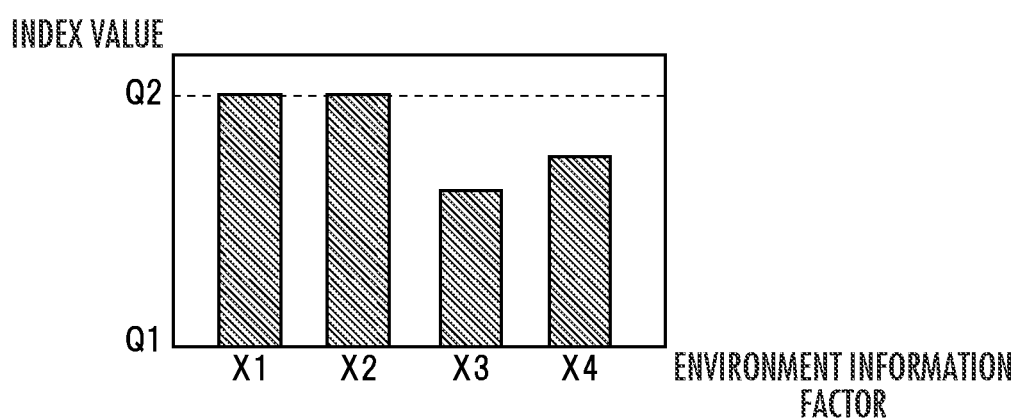

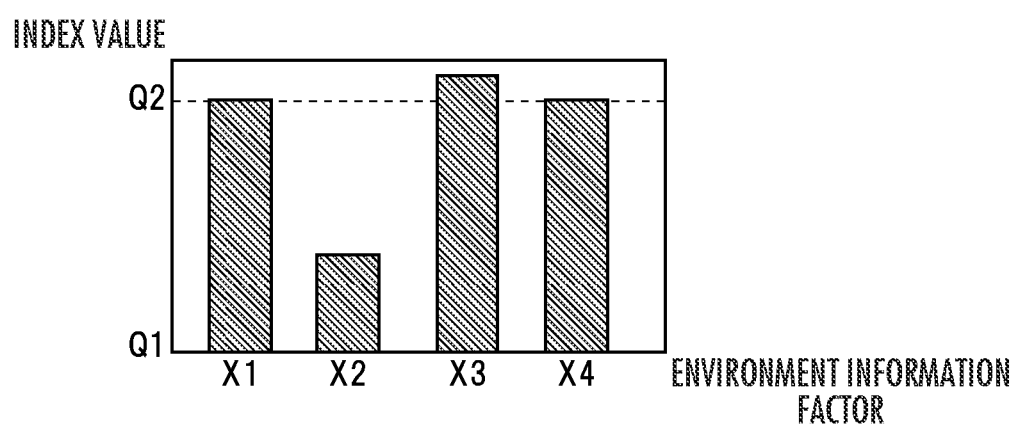

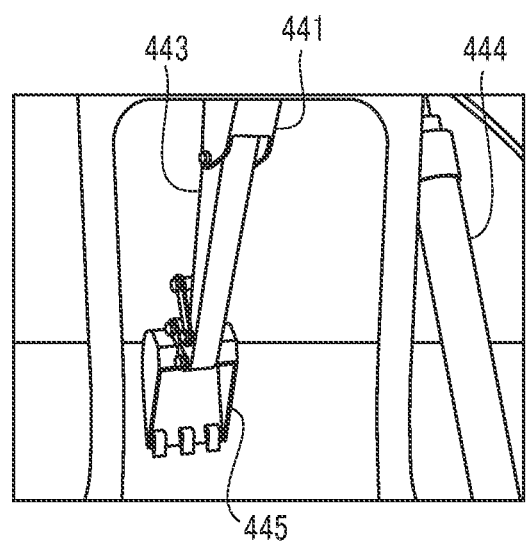

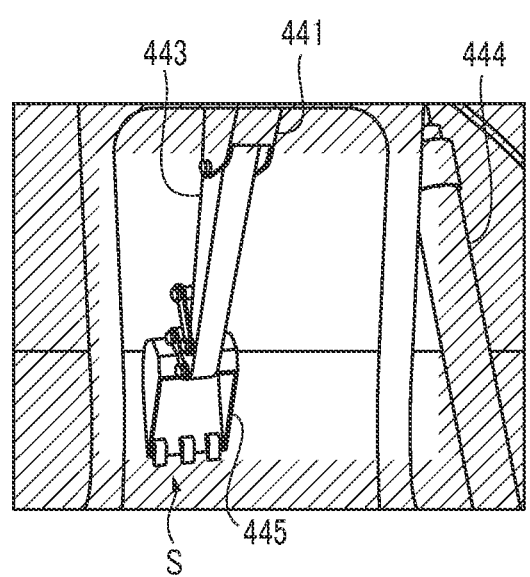

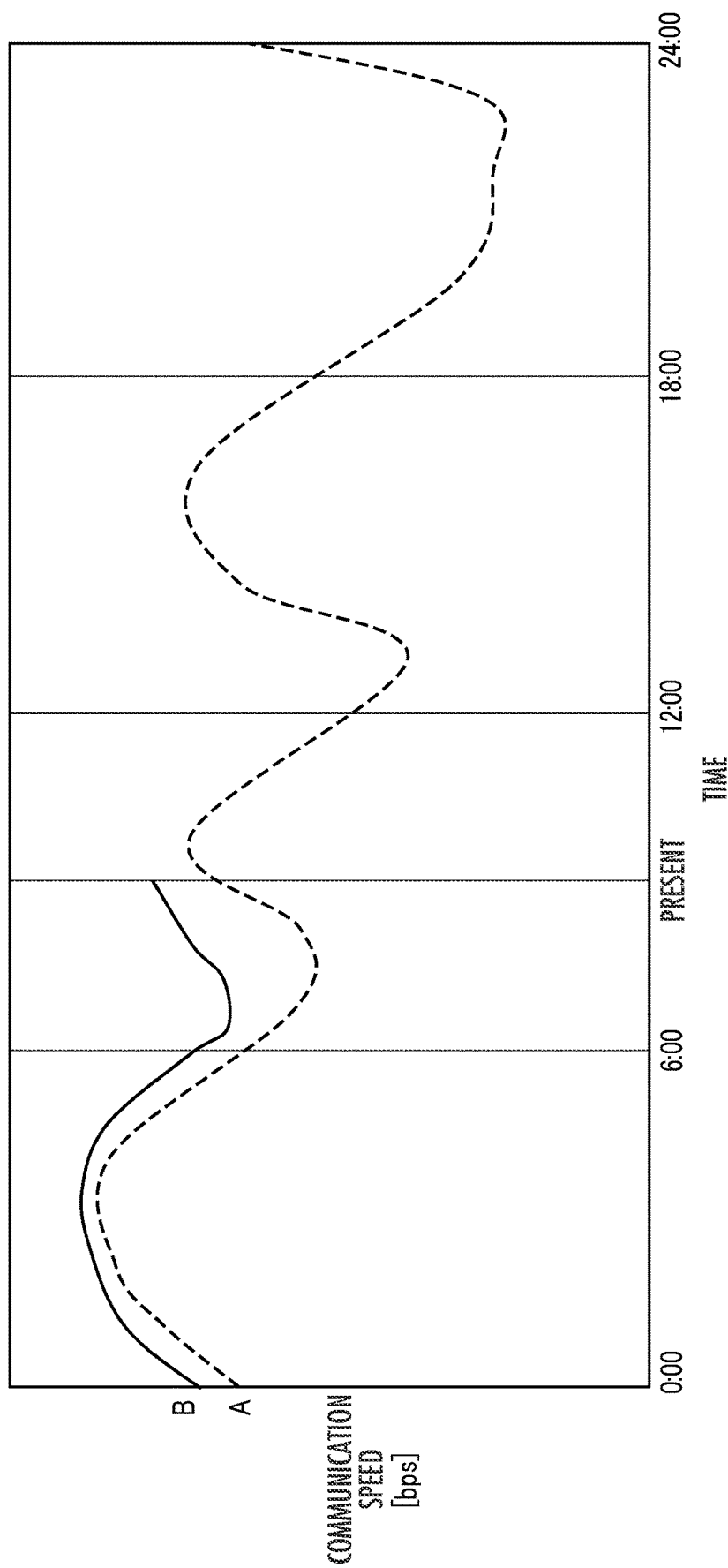

REMOTE OPERATION SYSTEM AND REMOTE OPERATION SERVER

TECHNICAL FIELD

The present invention relates to a system for remotely operating a work machine and the like.

BACKGROUND ART

It is essential that the communication is not disrupted to enable a smooth operation of a work machine such as a construction machine when the work machine is remotely operated. There is proposed a method of limiting an information amount of video provided to an operator or selectively providing only a directional video according to a pivoting direction of an upper pivoting body of the work machine among a plurality of different-directional videos with reference to the work machine, in a state where it is assumed that the operator has no intention to remotely operate the work machine (for example, in a state where a gateway cutoff lever is raised), (for example, see Patent Literature 1).

CITATION LIST

Patent Literature

Patent Literature 1
  Japanese Patent Laid-Open No. 2017-092908

SUMMARY OF INVENTION

Technical Problem

However, the above-described state may make it difficult for the operator to grasp the environment of the work machine only by limiting the information amount of video or selectively outputting the specific-directional video.

The present invention has an object to provide a system and the like capable of reducing a data communication load for outputting environment information, while avoiding excessive reduction in an information amount of the environment information in an appropriate form from the standpoint of each of a plurality of operators appropriately grasping an environment of a work machine according to a remote operation skill or the like of each of the plurality of operators.

Solution to Problem

A remote operation server of the present invention is a remote operation server having a function of mutual communication with a plurality of work machines and each of a plurality of remote operation devices for remotely operating one work machine to be remotely operated among the plurality of work machines, the remote operation server comprising a state recognition element configured to recognize an index value indicating at least one of a level of a remote operation skill of an operator of each of the plurality of remote operation devices and a degree of difficulty of a work content through the one work machine, a communication resource allocation process element configured to perform a communication resource allocation process for allocating, to each of the plurality of remote operation devices, a communication resource for mutual communication with the one work machine, based on the index value recognized by the state recognition element, and an environment information control process element configured to perform an environment information control process for adjusting each of a plurality of environment information factors in different modes according to a difference in the communication resource allocated by the communication resource allocation process element so that a data amount of environment data is reduced, the environment information factor being output in an information output device included in the remote operation device and defining an information amount of environment information according to the environment data acquired by an environment recognition device included in the work machine, the environment data indicating an environment of the work machine.

A remote operation system of the present invention comprises a plurality of work machines, a plurality of remote operation devices for remotely operating one work machine to be remotely operated among the plurality of work machines, and the remote operation server.

BRIEF DESCRIPTION OF DRAWINGS

FIG. 6 is an illustrative chart illustrating an allocation state of a communication resource with respect to each remote operation device.

FIG. 7A is an illustrative graph illustrating a control mode for environment information factors in a normal state.

FIG. 7C is an illustrative graph illustrating a second control mode for environment information factors according to the environment information control process.

FIG. 7D is an illustrative graph illustrating a third control mode for environment information factors according to the environment information control process.

FIG. 8A is an illustrative diagram illustrating environment information in the normal state.

FIG. 8B is an illustrative diagram illustrating the environment information in the environment information control process.

FIG. 9 is an illustrative graph illustrating time series of a communication speed in a work site of the work machine.

DESCRIPTION OF EMBODIMENTS (Configuration)

Figure 1:
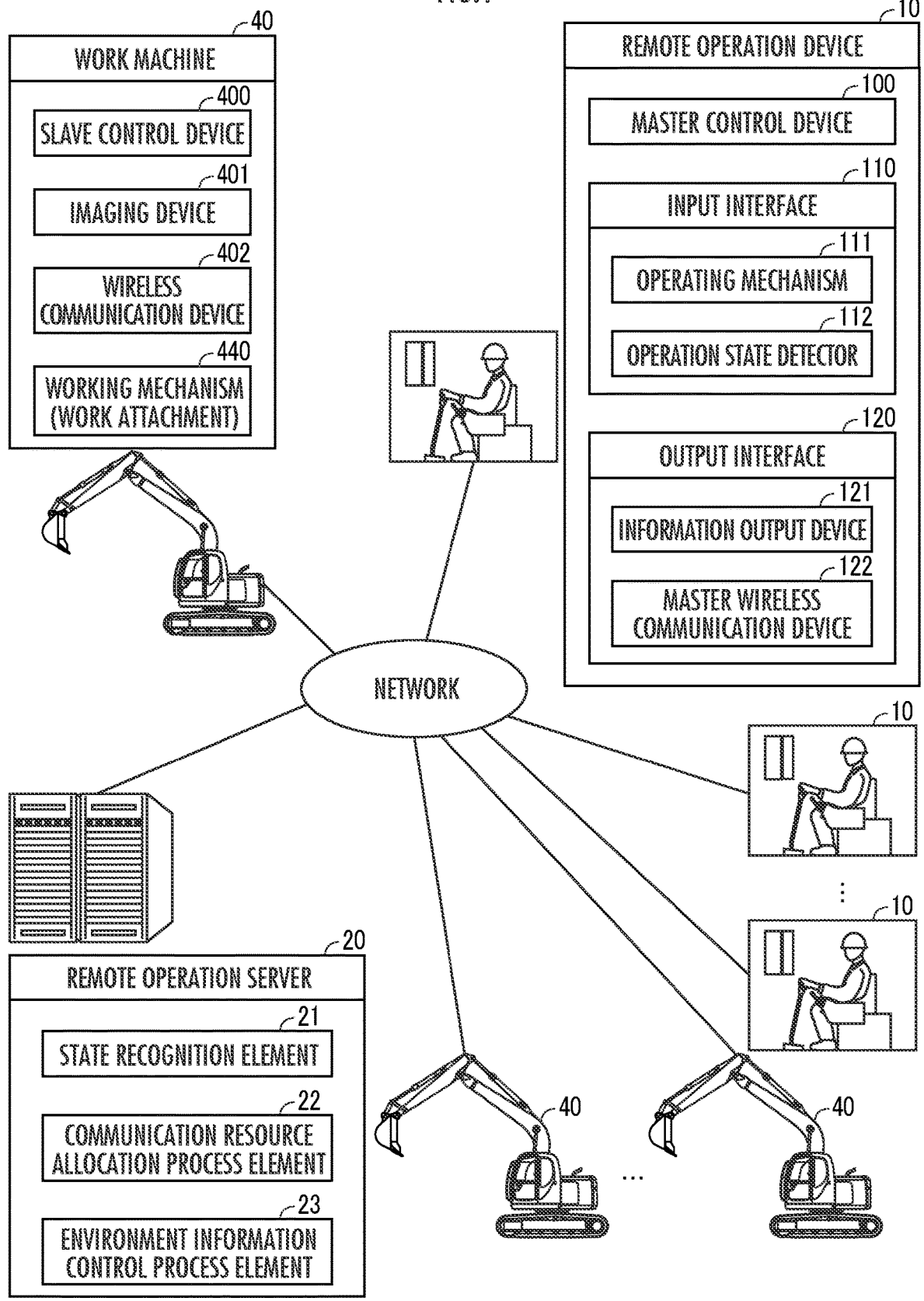
FIG. 1 is an illustrative diagram illustrating a configuration of a remote operation system as one embodiment of the present invention.

A remote operation system as one embodiment of the present invention illustrated in FIG. 1 comprises a plurality of remote operation devices 10, a remote operation server 20, and a plurality of work machines 40.
(Configuration of Work Machine)

Each of the plurality of work machines 40 comprises a slave control device 400, an environment recognition device 401, a wireless communication device 402, and a working mechanism 440. The slave control device 400 is comprised of an arithmetic processing device (a single core processor, a multi-core processor, or processor cores that constitute the multi-core processor), which reads necessary data and software from a memory or other storage device, and executes arithmetic processing on the data according to the software.

Figure 2:
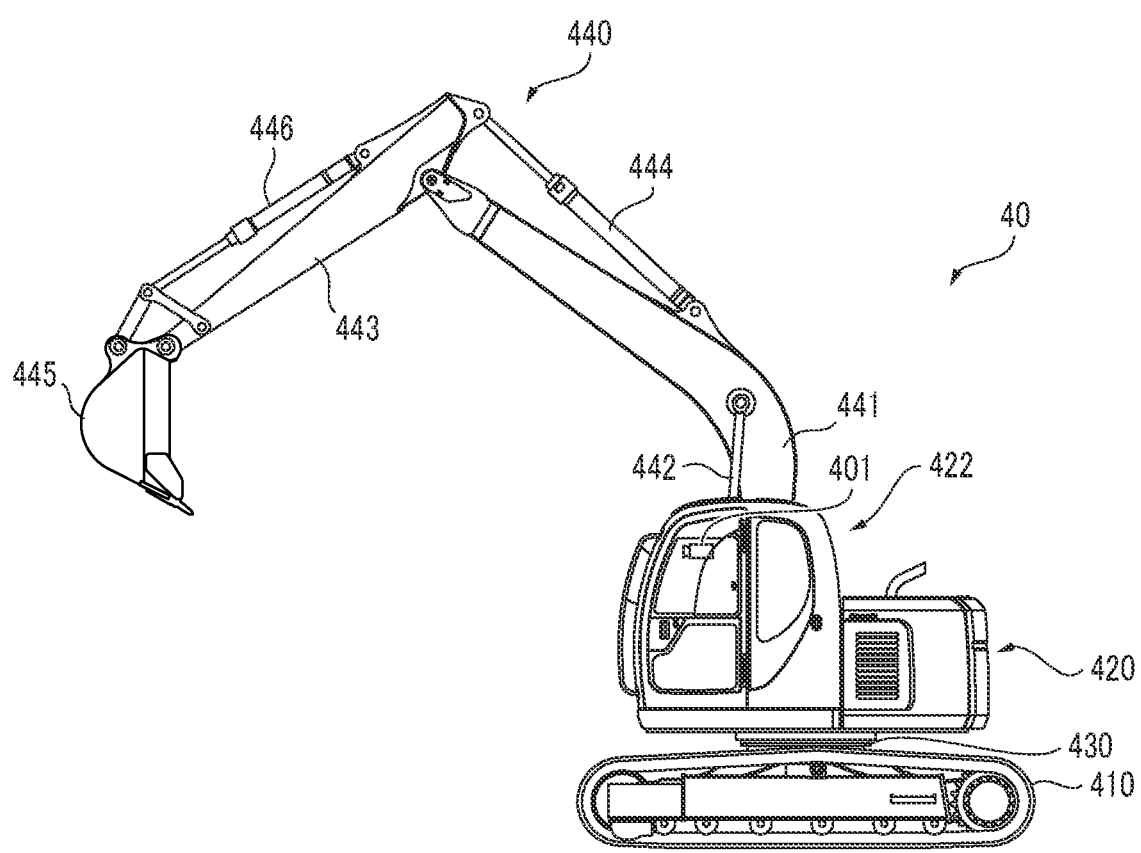
FIG. 2 is an illustrative diagram illustrating a configuration of a work machine.

The work machine 40 is, for example, a crawler excavator (construction machine), and comprises a crawler type lower traveling body 410, and an upper pivoting body 420 pivotally mounted on the lower traveling body 410 through the intermediary of a pivoting mechanism 430 as illustrated in FIG. 2. A cab (driver compartment) 422 is provided on the left front side of the upper pivoting body 420. A work attachment 440 is provided at the front center of the upper pivoting body 420. The plurality of work machines 40 may include a plurality types of work machines such as a crawler excavator and a crawler crane.

The work attachment 440 serving as a working mechanism comprises a boom 441 liftably attached to the upper pivoting body 420, an arm 443 rotatably connected to the distal end of the boom 441, and a bucket 445 rotatably connected to the distal end of the arm 443. To the work attachment 440, there are attached a boom cylinder 442, an arm cylinder 444, and a bucket cylinder 446 that are comprised of expandable hydraulic cylinders.

The boom cylinder 442 is interposed between the boom 441 and the upper pivoting body 420 such that the boom cylinder 442 expands or contracts by receiving the supply of hydraulic oil to thereby cause the boom 441 to pivot in an upward or downward direction. The arm cylinder 444 is interposed between the arm 443 and the boom 441 such that the arm cylinder 444 expands or contracts by receiving the supply of hydraulic oil to thereby cause the arm 443 to pivot on a horizontal axis with respect to the boom 441. The bucket cylinder 446 is interposed between the bucket 445 and the arm 443 such that the bucket cylinder 446 expands or contracts by receiving the supply of hydraulic oil to thereby cause the bucket 445 to pivot on the horizontal axis with respect to the arm 443.

The environment recognition device 401 is installed in the cab 422, for example, and is comprised of an imaging device configured to capture an image of an environment including at least a part of the working mechanism 440 through a front windshield of the cab 422. The environment recognition device 401 may comprise an acoustic input device comprised of a microphone or the like.

In the cab 422, there are provided actual machine operation levers corresponding to respective operation levers (described later) included in the remote operation device 10, and a drive mechanism or a robot configured to receive a signal according to an operation mode of each operation lever from a remote operation room and move the corresponding actual machine operation lever based on the received signal.

(Configuration of Remote Operation Device)

Each of the plurality of remote operation devices 10 comprises a master control device 100, an input interface 110, and an output interface 120. At least a part of the remote operation device 10 may be comprised of a mobile terminal device such as a smartphone, a tablet terminal or a notebook PC. The master control device 100 is comprised of an arithmetic processing device (a single core processor, a multi-core processor, or processor cores that constitute the multi-core processor), which reads necessary data and software from a memory or other storage device, and executes arithmetic processing on the data according to the software.

The input interface 110 comprises an operating mechanism 111, and an operation state detector 112. The output interface 120 comprises an information output device 121, and a wireless communication device 122.

The operating mechanism 111 includes a travel operation device, a pivoting operation device, a boom operation device, an arm operation device, a bucket operation device, and a cutoff operation device. Each operation device has an operation lever to be subjected to a pivoting operation. The operation lever (travel lever) of the travel operation device is operated to move the lower traveling body 410. The travel lever may also serve as a travel pedal. For example, the travel pedal fixed to the base or lower end of the travel lever may be provided. The operation lever (pivoting lever) of the pivoting operation device is operated to move a hydraulic pivoting motor included in the pivoting mechanism 430. The operation lever (boom lever) of the boom operation device is operated to move the boom cylinder 442. The operation lever (arm lever) of the arm operation device is operated to move the arm cylinder 444. The operation lever (bucket lever) of the bucket operation device is operated to move the bucket cylinder 446.

The operation lever (cutoff lever) of the cutoff operation device is locked such that the work machine 40 is not moved even when each operation lever such as the travel lever as described above is operated, while is operated to release the lock.

Figure 3:
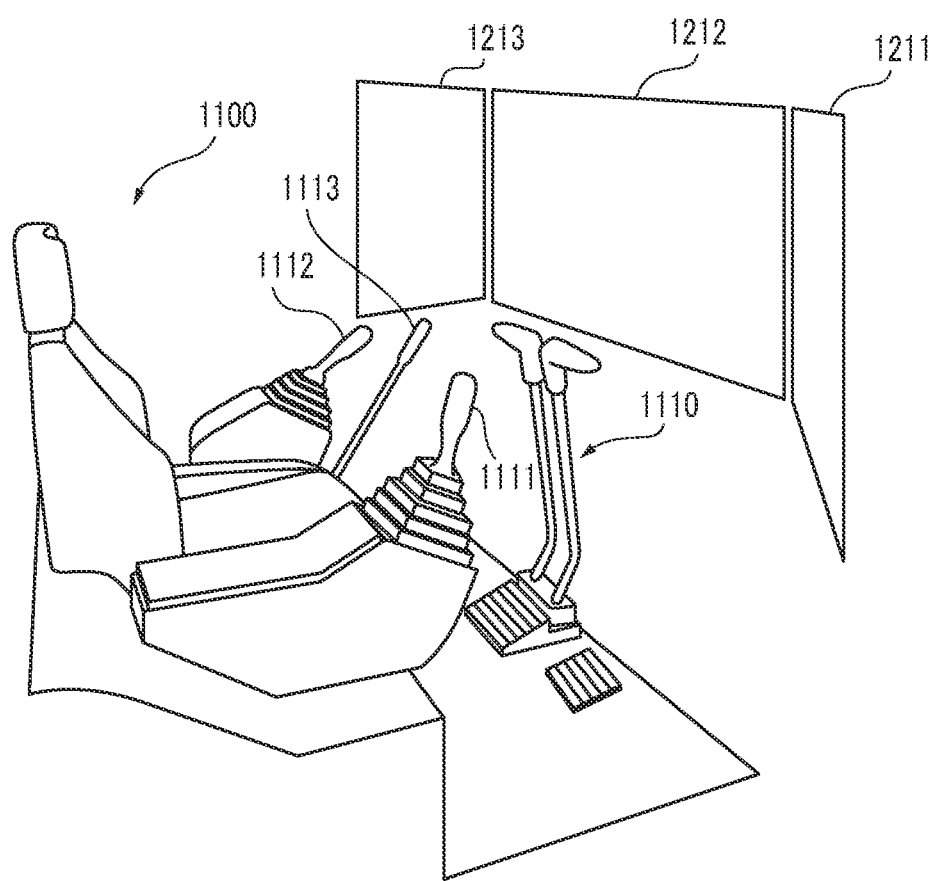
FIG. 3 is an illustrative diagram illustrating a configuration of a remote operation device.

Each operation lever constituting the operating mechanism 111 is arranged, for example, around a seat 1100 for an operator to sit on, as illustrated in FIG. 3. The seat 1100 is in the form of a high-back chair with armrests, but may be in any form that allows an operator to sit thereon, such as a low-back chair without a headrest, or a chair without a backrest.

A pair of left and right travel levers 1110 corresponding to the left and right crawlers are arranged side by side in front of the seat 1100. A single operation lever may serve as a plurality of operation levers. For example, a right operation lever 1111 provided in front of a right frame of the seat 1100 illustrated in FIG. 3 may function as the boom lever when operated in a front-rear direction, and may function as the bucket lever when operated in a left-right direction. Similarly, a left operation lever 1112 provided in front of a left frame of the seat 1100 illustrated in FIG. 3 may function as the arm lever when operated in the front-rear direction, and may function as the pivoting lever when operated in the left-right direction. The lever pattern may be arbitrarily changed according to an operating instruction of the operator.

A cutoff lever 1113 provided below the left operation lever 1112 in front of the left frame of the seat 1100 is locked when the cutoff lever 1113 is raised such that the work machine 40 is not moved even when each operation lever 1110, 1111, or 1112 is operated, while functions as an operation lever for releasing the lock when the cutoff lever is lowered.

The information output device 121 includes, for example, a diagonally forward right side image output device 1211, a forward side image output device 1212, and a diagonally forward left side image output device 1213 that are arranged in the diagonally forward right direction, the forward direction, and the diagonally forward left direction of the seat 1100, respectively, as illustrated in FIG. 3. The information output device 121 may further comprise a speaker (audio output device) arranged inside or around the seat 1100.

The operation state detector 112 detects an operation state of the operation device 10 for causing the operator to move the work machine 40. For example, the operation state detector 112 includes a sensor configured to output a signal according to a deformation amount or displacement amount of an urging mechanism comprised of a spring or an elastic member acting to cause the operation lever to be returned to original position and posture corresponding to a lever operation amount of zero, and an arithmetic processing device configured to estimate, based on the output signal of the sensor, that the pivoting lever is operated to pivot at a certain speed in a counterclockwise direction as viewed from above the upper pivoting body 420, and the like.

Alternatively, the operation state detector 112 may include a pressure sensitive sensor or a contact sensor provided to at least one of the operation levers constituting the operating mechanism 111, and the arithmetic processing device configured to estimate that the at least one operation lever is gripped by the operator. Alternatively, the operation state detector 112 may include a pressure sensitive sensor or a contact sensor provided to the seat 1110, and the arithmetic processing device configured to estimate that the operator is sitting on the seat 1110.

Alternatively, the operation state detector 112 may include a pilot pressure sensor configured to output a signal according to a pilot pressure corresponding to an operation amount of the actual machine operation lever provided to the work machine 40, and the arithmetic processing device configured to estimate, based on the output signal of the pilot pressure sensor, that the pivoting lever is operated to pivot at a certain speed in the counterclockwise direction as viewed from above the upper pivoting body 420, and the like.

(Configuration of Remote Operation Server)

The remote operation server 20 comprises a state recognition element 21, a communication resource allocation process element 22, and an environment information control process element 23. The state recognition element 21 is capable of communicating with the remote operation device 10 and the work machine 40. Additionally, a database server may be provided separately from or integrally with the remote operation server 20 such that the database server and the remote operation server 20 are capable of communicating with each other.

The state recognition element 21 recognizes an index value indicating at least one of a level of a remote operation skill of the operator of each of the plurality of remote operation devices 10 and a degree of difficulty of a work content through one work machine to be remotely operated, based on the communication with at least one of the remote operation device 10, the work machine 40, and the database server. The state recognition element 21 recognizes at least one of the operation state of the remote operation device 10 (or the operating mechanism 111 included in the remote operation device 10) by the operator and the motion state of the work machine 40, based on the communication with any one of the remote operation device 10 and the work machine 40.

The communication resource allocation process element 22 performs a communication resource allocation process based on the index value recognized by the state recognition element 21. The "communication resource allocation process" refers to an arithmetic process for allocating, to each of the plurality of remote operation devices 10, a communication resource for the mutual communication with one work machine 40.

The environment information control process element 23 performs an environment information control process for performing adjustment in different modes according to a difference in the communication resource allocated to each of the plurality of remote operation devices 10 by the communication resource allocation process element 22. The environment information control process element 23 performs the environment information control process in different modes according to a difference in the operation state of the remote operation device 10 or the motion state of the work machine 40 that is recognized by the state recognition element 21. The "environment information control process" refers to an arithmetic process for adjusting each of a plurality of environment information factors that defines an information amount of the environment information to be output by the information output device 121 of the remote operation device 10, such that a data amount of the environment data is reduced.

(Function)

Figure 4:
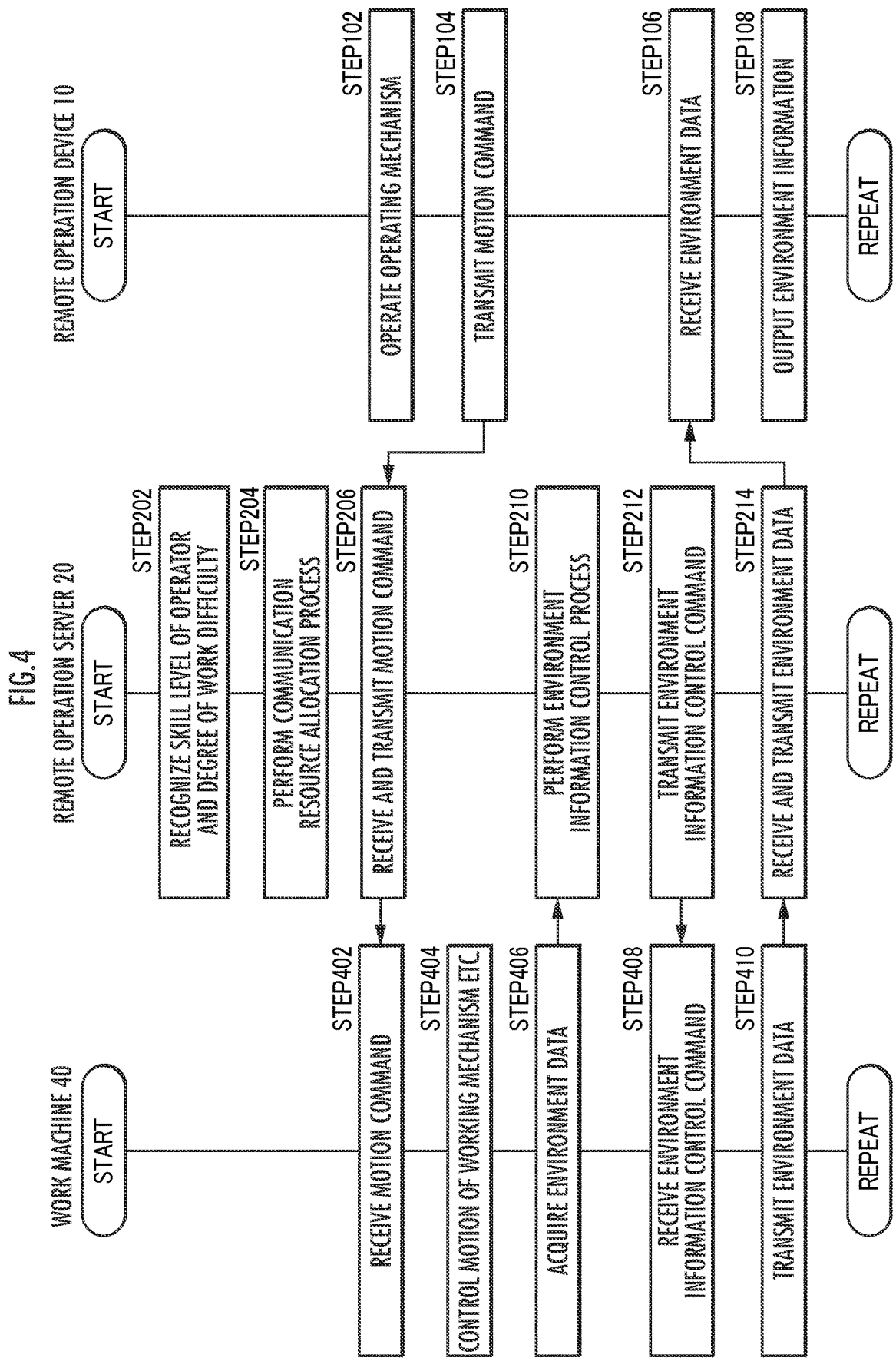
FIG. 4 is an illustrative diagram illustrating functions of a remote operation system as one embodiment of the present invention.

The state recognition element 21 recognizes index values indicating the level of the remote operation skill of the operator of each of the plurality of remote operation devices 10 and the degree of difficulty of the work content through one work machine to be remotely operated, based on the communication with at least one of the remote operation device 10, the work machine 40, and the database server (STEP 202 in FIG. 4). The mutual communication with one remote operation device 10 enables the state recognition element 21 to identify an operator who operates the one remote operation device 10. The communication with the database server enables the state recognition element 21 to recognize a work content allocated to the operator by referring to the database.

An index value $x_i$ indicating the level of the remote operation skill of each operator $P_i$ (i=1, 2, ..., N) and an indicator value $y_j$ indicating the degree of difficulty of each work $T_j$ (j=1, 2, ..., M) are stored and held in the storage device constituting the database server, or the remote operation device 10 (master control device 100) or the work machine 40 (slave control device 400). The index value $x_i$ is scored and evaluated based on factors such as the number of implementation times for each of a plurality of different works (the greater the number of implementation times is, the higher the level of the skill is), an average implementation time for each of the plurality of different works (the shorter the average implementation time is, the higher the level of the skill is), and the number of operational errors (the smaller the number of errors is, the higher the level of the skill is). The index value $y_j$ is scored and evaluated based on factors such as an average implementation time of each work (the shorter the average implementation time is, the higher the degree of difficulty is), and the operation frequency of the operating mechanism 111 by each operator (the higher the frequency is, the higher the degree of difficulty is).

Table 1 shows the work contents and the degree of difficulty of each work content that are implemented in the time period from t0 to t3 by each of the operators $P_i$ (i=1 to 4) having a skill level $x_i$. A first operator P1 implements a work Q1 (difficulty degree y1) in the time period from t0 to t1, and subsequently implements a work Q2 (difficulty degree y2) in the time period from t1 to t3. A second operator P2 implements the work Q2 (difficulty degree y2) in the time period from t0 to t1, and subsequently implements the work Q1 (difficulty degree y1) in the time period from t1 to t3. A third operator P3 consistently implements the work Q1 (difficulty degree y1) in the time period from t0 to t3. A fourth operator P4 implements the work Q2 (difficulty degree y2) only in the time period from t2 to t3.

An index value $z_i$ has a decreasing function using the skill level $x_i$ as a main variable (the higher the skill level $x_i$ is, the smaller the index value $z_i$ is), while has an increasing function using the work difficulty degree $y_i$ as a main variable (the higher the work difficulty degree $y_i$ is, the greater the index value $z_i$ is). The index value $z_i$ is evaluated according to the relational expression (1), for example.

$$z_i = y_i / x_i \quad (1)$$

TABLE 1

| Operator | Work content in each time period (degree of work difficulty) | | |
|---|---|---|---|
| (skill) | t0-t1 | t1-t2 | t2-t3 |
| P1 (x1) | O1 (y1) | O2 (y2) | O2 (y2) |
| P2 (x2) | O2 (y2) | O1 (y1) | O1 (y1) |
| P3 (x3) | O1 (y1) | O1 (y1) | O1 (y1) |
| P4 (x4) | — | — | O2 (y2) |

The communication resource allocation process element 22 performs a communication resource allocation process based on the index value recognized by the state recognition element 21. The "communication resource allocation process" refers to an arithmetic process for allocating, to each of the plurality of remote operation devices 10, a communication resource for the mutual communication with one work machine 40.

The communication resource allocation process is performed such that the sum $\Sigma B_i$ of communication resources $B_i$ to be allocated to the respective remote operation devices 10 is equal to or smaller than a maximum value Bmax of the communication resource (STEP 204 in FIG. 4). For example, the communication resource $B_i$ to be allocated to the remote operation device 10 operated by the operator Pi is set according to the relational expression (2) based on the index value $z_i$, the sum $\Sigma z_i$ of the index values $z_i$ of the respective operators to which the communication resources are to be allocated at the same time point or in the same time period, and the maximum value Bmax of the communication resource.

$$B_i = B\text{max} \cdot z_i / (\Sigma z_i + \delta) \quad (2)$$

In the relational expression, $\delta$ is an adjustment coefficient. For example, when the sum value $\Sigma y_i$ of the degrees $y_i$ of work difficulty is equal to or greater than a reference value, the adjustment coefficient is set to "0," and when the sum value $\Sigma y_i$ of the degrees $y_i$ of work difficulty is below the reference value, the adjacent coefficient is set to a positive value that gradually or continuously increases as the sum value $\Sigma y_i$ further falls below the reference value.

Figure 5:
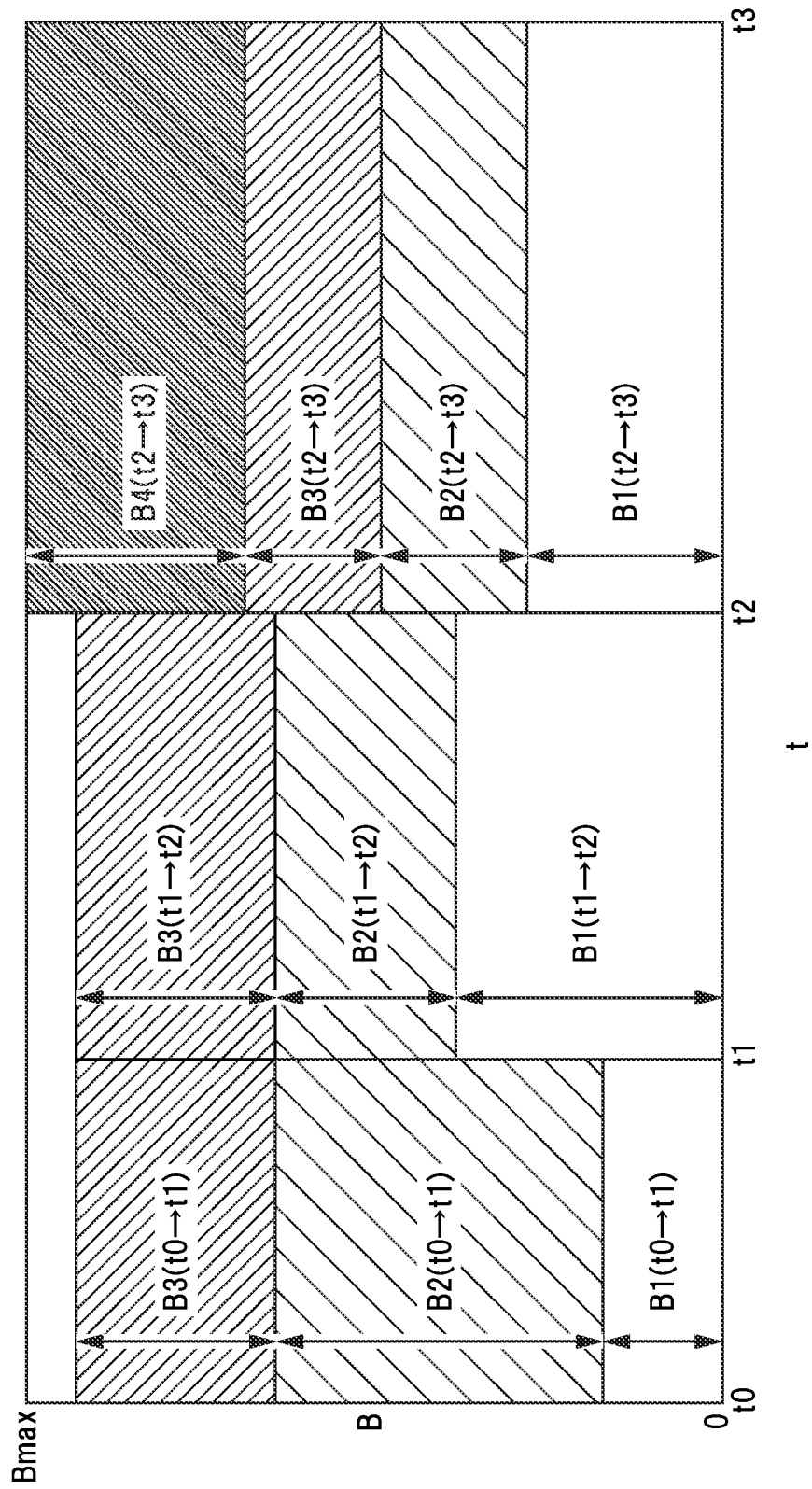
FIG. 5 is an illustrative chart illustrating an allocation state of a communication resource with respect to each remote operation device.

FIG. 5 illustrates an allocation state of the communication resource $B_i$ with respect to each remote operation device 10 in each of the time periods [t0, t1],[t1, t2], and [t2, t3] when the works are implemented with the individual work machines 40 through the individual remote operation devices 10 by the four operators Pi as shown in Table 1. In FIG. 6, a change over time of a communication resource B1 is indicated by a chain line, and a change over time of a communication resource B2 is indicated by a two-dot chain line, a change over time of a communication resource B3 is indicated by a solid line, and a change over time of a communication resource B4 is indicated by a broken line. The communication resource $B_i$ is, for example, a communication speed (communication capacity per unit time).

In the time period [t0, t1], there is a magnitude relationship of B1<B3<B2. This is because each of the first operator P1 and the third operator P3 implements the common first work Q1, but the skill level x1 of the first operator P1 is higher than the skill level x3 of the third operator P3. Additionally, this is because the skill level x2 of the second operator P2 is slightly higher than the skill level x3 of the third operator P3, while the difficulty degree y1 of the first work Q1 is higher than the difficulty degree y2 of the second work Q2. $\Sigma B_i = B1+B2+B3$ falls below the maximum value Bmax of the communication resource. This is because the sum value $\Sigma y_i = 2y1+y2$ of the degrees $y_i$ of work difficulty falls below the reference value ($\delta > 0$ in the relational expression (2)).

In the time period [t1, t2], there is a magnitude relationship of B2<B3<B1. This is because each of the second operator P2 and the third operator P3 implements the common first work Q1, but the skill level x2 of the second operator P2 is higher than the skill level x3 of the third operator P3. Additionally, this is because the skill level x1 of the first operator P1 is higher than the skill level x3 of the third operator P3, while the difficulty degree y1 of the first work Q1 is higher than the difficulty degree y2 of the second work Q2. $\Sigma B_i = B1+B2+B3$ falls below the maximum value Bmax of the communication resource. This is because the sum value $\Sigma y_i = y1+2y2$ of the degrees $y_i$ of work difficulty falls below the reference value ($\delta > 0$ in the relational expression (2)). The communication resource B3 is constantly maintained in the time period [t0, t1] and the time period [t1, t2].

In the time period [t2, t3], there is a magnitude relationship of B2<B3<B1<B4. This is because in addition to the above-described reason for the time period [t1, t2], each of the first operator P1 and the third operator P3 implements the common first work Q1, but the skill level x1 of the first operator P1 is higher than the skill level x4 of the fourth operator P4. $\Sigma B_i = B1+B2+B3+B4$ is equal to the maximum value Bmax of the communication resource. This is because the sum value $\Sigma y_i = 2y1+2y2$ of the degrees $y_i$ of work difficulty is equal to or greater than the reference value ($\delta = 0$ in the relational expression (2)). Each of the communication resources B1, B2, and B3 in the time period [t2, t3] is lower than that in the time period [t1, t2]. This is because a part of the communication resource is allocated to the remote operation device 10 operated by the fourth operator P4.

In the remote operation device 10, the operating mechanism 111 is operated by the operator (STEP 102 in FIG. 4), and in response to this, the master control device 100 transmits a motion command according to the operation mode to the remote operation server 20 through the wireless communication device 122 (STEP 104 in FIG. 4).

In the remote operation server 20, the state recognition element 21 receives the motion command from the remote operation device 10, and transmits the motion command to the work machine 40 (STEP 206 in FIG. 4).

In the work machine 40, the slave control device 400 receives the motion command through the wireless communication device 402 (STEP 402 in FIG. 4). In response to this, the motion of the work attachment 440 and the like is controlled by the slave control device 400 (STEP 404 in FIG. 4). For example, work is performed in which earth forward of the work machine 40 is scooped into the bucket 445, and the upper pivoting body 420 is caused to pivot, to thereafter allow the earth to fall from the bucket 445.

In the work machine 40, the environment recognition device 401 acquires a captured image as the environment information (STEP 406 in FIG. 4). At this time, the audio information may be acquired as the environment information. When the master control device 100 controls the wireless communication device 122 so that an operation start command is transmitted from the remote operation device 10 to the work machine 40 through the remote operation server 20, while using this as a trigger, the environment information may start to be acquired. For example, in the remote operation device 10, the operation start command is output when a button or an operation lever included in the input interface 110 or the operating mechanism 111 is operated at a predetermined mode. The environment information acquired by the environment recognition device 401 is transmitted from the work machine 40 and is received by the remote operation server 20.

In the remote operation server 20, the environment information control process is performed by the environment information control process element 23 (STEP 210 in FIG. 4). The "environment information control process" refers to an arithmetic process for adjusting each of a plurality of environment information factors that defines an information amount of the environment information to be output by the information output device 121 of the remote operation device 10, such that a data amount of the environment data is reduced. Specifically, it refers to an arithmetic process for adjusting the plurality of environment information factors in different modes such that a reduction in the information amount of a "low environment information factor" among the plurality of environment information factors is greater than that of a "high environment information factor" among the plurality of environment information factors.

It may be configured that the environment information control process is performed by the environment information control process element 23 only in the case where a result of the determination as to whether to perform the execution process is affirmative. For example, it may be determined whether the operation state of the operating mechanism 111 according to the motion command is a specified operation state to be subjected to the environment information control process. The motion state of the work machine 40 according to the motion command may be recognized by the communication between the remote operation server 20 and the work machine 40, and it may be determined whether the motion state of the work machine 40 is a specified motion state to be subjected to the environment information control process. The environment information control process element 23 may recognize a communication speed of the communication between the remote operation server 20 and the remote operation device 10 or the work machine 40, and then determine that the communication speed is below the reference value.

The environment information control process is performed in different modes according to a difference in the communication resource allocated to the remote operation device 10. The environment information control process is performed by classifying the environment information factors into the high environment information factor and the low environment information factor in different modes such that for example, the more the communication resource allocated to the remote operation device 10 is, the smaller the number of environment information factors classified into the high environment information factor is, while for example, the less the communication resource allocated to the remote operation device 10 is, the greater the number of environment information factors classified into the high environment information factor is.

Furthermore, the environment information control process is performed by classifying the environment information factors into the high environment information factor and the low environment information factor in different modes, according to the difference in the operation state that is at least one of a motion command from the remote operation device 10 and the motion state of the work machine 40 according to the motion command.

Figure 7B:
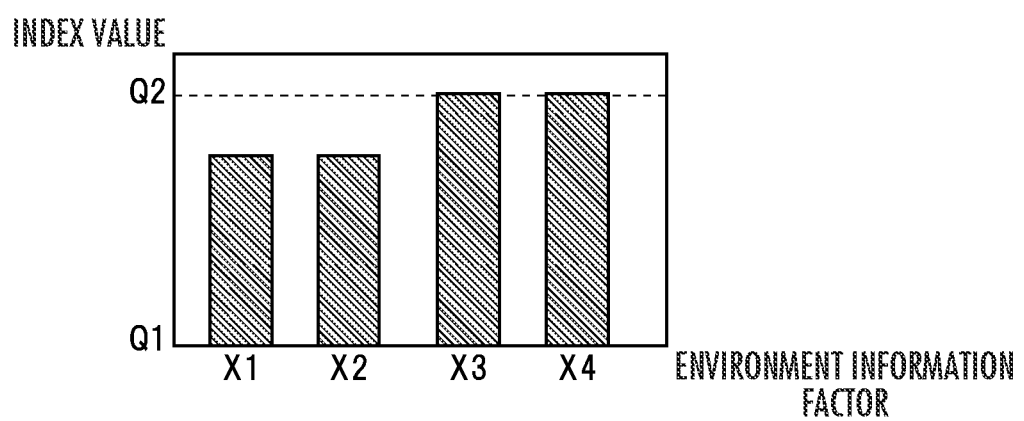
FIG. 7B is an illustrative graph illustrating a first control mode for environment information factors according to an environment information control process.

FIG. 7A shows a situation where each value of four environment information factors $X1$ to $X4$ that defines the information amount of the environment information is a reference value $Q2$ normalized with reference to a lower limit value $Q1$, in a normal state, i.e., a state where the environment information control process is not performed. When the environment information is an image, the four environment information factors $X1$ to $X4$ are, for example, a resolution, a frame rate, the number of dimensions of a pixel value, and a width of an output image range. When the audio is included in the environment information, the plurality of environment information factors include at least one of a sampling frequency, a quantization bit count, and a frequency band of sound, for example. FIGS. 7B to 7D each show a target value or a command value of the four environment information factors $X1$ to $X4$, in the case where the operation states of FIGS. 7B to 7D are first to third specified operation states, respectively.

In the first specified operation state, the values of the environment information factors $X1$ and $X2$ are lower than the reference value $Q2$, and the values of the environment information factors $X3$ and $X4$ are maintained at the reference value $Q2$ (see FIG. 7B). In this case, the environment information factors $X3$ and $X4$ correspond to the "high environment information factor," and the environment information factors $X1$ and $X2$ correspond to the "low environment information factor" to be adjusted such that the reduction in the information amount of the environment information is greater than that for the high environment information factor.

In the second specified operation state, the values of the environment information factors $X3$ and $X4$ are lower than the reference value $Q2$, the reduction amount for the environment information factor $X3$ is greater than that for the environment information factor $X4$, and the values of the environment information factors $X1$ and $X2$ are maintained at the reference value $Q2$ (see FIG. 7C). In this case, the environment information factors $X1$ and $X2$ correspond to the "high environment information factor," and the environment information factors $X3$ and $X4$ correspond to the "low environment information factor" to be adjusted such that the reduction in the information amount of the environment information is greater than that for the high environment information factor. Furthermore, the environment information factor $X4$ corresponds to the "high environment information factor (or a primary low environment information factor)," and the environment information factor $X3$ corresponds to the "low environment information factor (or a secondary low environment information factor)" to be adjusted such that the reduction in the information amount of the environment information is greater than that for the high environment information factor.

In the third specified operation state, the value of the environment information factor $X2$ is lower than the reference value $Q2$, the value of the environment information factor $X3$ is higher than the reference value $Q2$, and the values of the environment information factors $X1$ and $X4$ are maintained at the reference value $Q2$ (see FIG. 7D). In this case, the environment information factor $X3$ corresponds to the "high environment information factor," and the environment information factors $X1$, $X2$, and $X4$ correspond to the "low environment information factor" to be adjusted such that the reduction in the information amount of the environment information is greater than that for the high environment information factor. Furthermore, the environment information factors X1 and X4 correspond to the "high environment information factor (or the primary low environment information factor)," and the environment information factor X2 corresponds to the "low environment information factor (or the secondary low environment information factor)" to be adjusted such that the reduction in the information amount of the environment information is greater than that for the high environment information factor.

For example, each of the plurality of environment information factors may be adjusted, as shown in Table 2, according to the remote operation state of the work machine 40.

environment information factors are reduced. When the work involving movement such as the pivoting is performed, it is desirable that the image range is not reduced.

The finish excavation operation (state F) refers to a state where a remaining earth and sand region on the excavation plan surface after the rough excavation is excavated, for example. In this state, it is desirable that the values of the environment information factors are not reduced. In the case where the reduction in communication load is forced, when the bucket and the like are operated, the values of the environment information factors are reduced without affecting the workability by maintaining the frame rate while reducing the image range. Additionally, in the case where the

TABLE 2

| | Operation content | Environment information factor (↗: increase, ↘: reduction, —: maintenance with reference to reference value) | | | |
|---|---|---|---|---|---|
| | | Resolution | Frame rate | Pixel value (color) | Image range |
| A | State of cutoff lever being raised | ↘\| | ↘\| | ↘ (Gray) | — or ↘\| |
| B | State of cutoff lever being raised and gripped | — | ↘\| | — (Color) | — |
| C | Pivoting operation of upper pivoting body | ↘ | — | — (Color) | — or ↗ |
| D | Parallel traveling operation of lower traveling body | — | — | — (Color) | — |
| E | Rough excavation | ↘ | — | ↘ (Gray) | — or ↘\| |
| F | Finish excavation | — | — or ↘ | — (Color) | — or ↘\| |

In Table 2, the state of the cutoff lever being raised (state A) refers to a state where the operator has no intention to operate the work machine 40, and the values of the environment information factors are reduced. However, the value of the image range may be maintained to maintain the field of view.

The state of the cutoff lever being raised and gripped (state B) refers to a state where the operator has no intention to operate the work machine 40, similarly to the state A, and achieves a state where the reduction in the environment information factor is relieved when the operator grips the operation lever. For example, the state indicates a state of the environment information factors being adjusted when it is confirmed that a truck for transporting earth and sand will be moved to a predetermined position. Since the work such as excavation is not performed, the frame rate can be reduced.

When the pivoting operation of the upper pivoting body (state C) is performed, the resolution is reduced. This object is to reduce the difficulty of viewing the image and the discomfort that are caused by a high-speed movement of the image. On the other hand, the image range can be increased, to secure the visibility in the pivoting direction.

When the parallel traveling operation of the lower traveling body (state D) is performed, highly accurate information is required mainly about the moving direction, and it is desirable that the values of the environment information factors are not reduced. In the case where the reduction in communication load is forced, the maintenance of the image range can take precedence, to secure the visibility in the traveling direction.

The rough excavation operation (state E) refers to a state where the excavation is performed up to a surface away from an excavation plan surface while placing importance on the working speed. The frame rate is maintained, but a problem in work does not appear even when the values of the other operation of bucket and the like is poor such as when the operator confirms the working surface, for example, the image range may be maintained while reducing the frame rate.

A grading operation (a combination of the state D and the state E) is also assumed as a combination of the above-described states. When only a leveling work is performed by the bucket, the image range is reduced, but when the traveling operation is added, it is desirable that the image range is not reduced.

Subsequently, in the remote operation server 20, the environment information control process element 23 transmits an environment information control command to the work machine 40 (STEP 212 in FIG. 4). The environment information control command includes the data for specifying the adjustment state of the plurality of factors in addition to the data as to whether the state is the normal state or the specified operation state (whether the environment information control process is performed).

In the work machine 40, the slave control device 400 receives the environment information control command through the wireless communication device 402 (STEP 408 in FIG. 4). The slave control device 400 adjusts a data amount of the environment data indicating the captured image according to the environment information control command, and transmits the data to the remote operation server 20 (STEP 410 in FIG. 4).

In the remote operation server 20, the environment information control process element 23 receives the environment data from the work machine 40, and transmits the environment data to the remote operation device 10 (STEP 214 in FIG. 4).

In the remote operation device 10, the master control device 100 receives the environment data through the wireless communication device 122 (STEP 106 in FIG. 4). The master control device 100 outputs the environment information according to the environment data (all or a part of the captured image itself or a simulated environment information generated based on the captured image) to the information output device 121 (STEP 108 in FIG. 4).

In this way, in the normal state, as illustrated in FIG. 8A, for example, the environment information including the boom 441, the arm 443, the bucket 445, and the arm cylinder 444 that are a part of the work attachment 440 serving as the working mechanism is output to each of a high information output device 121 and a low information output device 221. When the environment information factor X1 is the "output image range the same as that in the normal state" and the environment information factor X2 is the "resolution," in the first specified operation state (see FIG. 7B), the environment information is output to the information output device 121, the information indicating that a part of the environment information (for example, a rectangular region at a center) has the resolution similar to that in the normal state, and the other parts (for example, a region surrounding the partial region in a rectangular shape) have the resolution lower than that in the normal state. Alternatively, when the environment information factor X1 is the "output image range" and the environment information factor X2 is the "resolution," in the first specified operation state, the environment information is output to the information output device 121, the information indicating that only a part has the resolution lower than that in the normal state (see FIG. 8B).

A single image region in the information output device 121 may be specified by the "output image range (or the output image range the same as that in the normal state)" as the environment information factor, or a plurality of image regions may be specified. An image region in which a spread state (specified by shape, size, the position of the center of gravity, and the like) is constant in time series in the information output device 12 may be specified by the "output image range" as the environment information factor, or an image region in which the spread state changes in time series in the information output device 121 such as an image region including the bucket 445 may be specified.

When the environment information factor X3 is the "number of dimensions of a pixel value" and the environment information factor X4 is the "frame rate," in the second specified operation state (see FIG. 7C), the environment information is output to the information output device 121, the information indicating, for example, that the frame rate of the environment information is reduced (24 to 30 FPS to 2 to 10 FPS) and a two-dimensional (four-dimensional in the case where the color is represented by a three-dimensional vector such as RGB values) pixel value including the color and the brightness value in the normal state has a one-dimensional pixel value including only a brightness value (gray scale).

In the case where the information amount of the present environment information is lower than that of the previous environment information, in addition to the present environment information, a predetermined number of pieces of environment information before the previous time may be output from the information output device 121. For example, in the case where the resolution of the present environment image as the environment information is lower than that of the previous environment image, in addition to the present environment information, the previous environment information of a predetermined number of pieces or environment information before the previous time may be output to and displayed on the information output device.

(Effect)

According to the remote operation system thus configured and the remote operation server 20 included in the remote operation system, the communication resource allocation process is performed according to the index value (STEP 204 in FIG. 4, see FIGS. 5 and 6). The "index value" is a value indicating at least one of a level of a remote operation skill of the operator of each of the plurality of remote operation devices 10 and a degree of difficulty of a work content through one work machine to be remotely controlled (see the relational expression (1)). Therefore, a communication resource is allocated to each remote operation device in an appropriate form in view of one or both of the level of the remote operation skill of each operator and the degree of difficulty of the work content through the work machine 40.

When the "environment information control process" is performed, each value of the plurality of environment information factors that defines the information amount of the environment information is adjusted. Specifically, the data amount of the environment data is reduced such that the reduction in the information amount of one or a plurality of low environment information factors is greater than the reduction in the information amount of one or a plurality of high environment information factors (meaning the reduction in the information amount of the environment information due to a change in the environment information factor) (STEP 210 in FIG. 4, see FIGS. 7A to 7D). In correspondence to a data amount adjusted such that the reduction in the information amount of the low environment information factors is relatively greater than the reduction in the information amount of the high environment information factors, the data amount can be reduced, and the communication load of the environment data can be reduced. On the other hand, in correspondence to a data amount adjusted such that the reduction in the information amount of the high environment information factors is relatively smaller than the reduction in the information amount of the low environment information factors, the excessive reduction in the data amount, and the excessive reduction in the information amount of the environment information can be avoided.

Therefore, the excessive reduction in the information amount of the environment information can be avoided in an appropriate form so that the operator can appropriately grasp the environment of the work machine in view of the level of the remote operation skill of the operator and the degree of difficulty of the work content while reducing the data communication load for outputting the environment information.

In the case where the environment information control process is performed by classifying the environment information factors into the high environment information factor and the low environment information factor in different modes such that one of the low environment information factors becomes a high environment information factor for another one of the low environment information factors, the width of the adjustment of the plurality of environment information factors is extended according to the difference in the operation state. Therefore, the excessive reduction in the information amount of the environment information can be avoided in an appropriate form further minutely from the standpoint of an operator appropriately grasping the environment of the work machine according to the operation state of the work machine by the operator while reducing the data communication load for outputting the environment information.

The environment information control process adjusts each of the plurality of environment information factors in different modes according to a difference in the allocation state of the communication resource to each remote operation device. Furthermore, the environment information control process adjusts each of the plurality of environment information factors in different modes according to a difference in the operation state (at least one state of the motion command according to the operation state of the operating mechanism 111 by the operator and the motion state of the work machine 40 according to the motion command) Specifically, the environment information control process is performed by classifying the environment information factors into the high environment information factor and the low environment information factor in different modes according to the difference (see FIGS. 7A to 7D). Therefore, the excessive reduction in the information amount of the environment information can be avoided in an appropriate form from the standpoint of an operator appropriately grasping the environment of the work machine 40 according to the remote operation state of the work machine 40 by the operator while reducing the data communication load for outputting the environment information (see FIGS. 8A to 8B).

(Other Embodiments of the Present Invention)

The above-described embodiment is configured to recognize the work content in each time period (the degree of work difficulty) (STEP 202 in FIG. 4) and perform the communication resource allocation process (STEP 204 in FIG. 4). However, as the other embodiments, the communication speed in each time period at the work site may be added to the work content (the degree of work difficulty). For example, an average value A of communication speeds between the work machine 40 and the remote operation server 20 in each time period during the past 30 days is recorded, as illustrated in FIG. 9. When it is determined that there is a margin in the communication speed in the time period during the work is performed, in view of a present communication speed B and the average value A of the communication speeds, it is determined that no change in the degree of difficulty is caused by the communication speed. On the other hand, when it is determined that there is no margin in the communication speed, it may be determined that the skill required for the degree of work difficulty is further needed due to the reduction in the communication speed.

In the other embodiments, the environment information control process element 23 included in the remote operation server 20 receives the environment data from the work machine 40 in the same manner as in the normal state, and then performs the environment information control process, whereby the data amount of the environment data to be transmitted to the remote operation device 10 may be adjusted to be increased or reduced.

In the other embodiments, the remote operation server 20 or the environment information control process element 23 may be included in the master control device 100, so that the remote operation device 10 and the work machine 40 can mutually communicate directly or through a radio communication base station. In this case, the environment information control process is performed by the master control device 100 having the same function as that of the environment information control process element 23, whereby the data amount of the environment data to be transmitted from the work machine 40 to the remote operation device 10 may be adjusted to be increased or reduced. The master control device 100 and the remote operation server 20 can mutually communicate through the communication circuit in a common processor or the communication circuit connecting a separate processor.

In the other embodiments, the remote operation server 20 or the environment information control process element 23 may be included in the slave control device 400, so that the remote operation device 10 and the work machine 40 can mutually communicate directly or through a radio communication base station. In this case, the environment information control process is performed by the slave control device 400 having the same function as that of the environment information control process element 23, whereby the data amount of the environment data to be transmitted from the work machine 40 to the remote operation device 10 may be adjusted to be increased or reduced. The slave control device 400 and the remote operation server 20 can mutually communicate through the communication circuit in a common processor or the communication circuit connecting a separate processor.

In the above-described embodiment, the plurality of environment information factors are adjusted by being classified into the high environment information factor and the low environment information factor. However, as the other embodiments, a plurality of environment information factors may be adjusted uniformly without being classified into the high environment information factor and the low environment information factor according to at least one specified operation state of the remote operation device 10 or at least one specified motion state of the work machine 40. That is, all of the plurality of environment information factors may be controlled so that the reduction amount from the reference value Q2 becomes uniform.

In the above-described embodiment, the motion command is transmitted from the remote operation device 10 to the work machine 40 through the remote operation server 20 (see STEP 104 STEP 204 STEP 402 in FIG. 4). However, as the other embodiments, the motion command may be transmitted from the remote operation device 10 to the work machine 40 through a radio communication base station. In this case, the environment information control process element 23 may recognize the motion command or the operation state of the remote operation device 10 according to the motion command based on a result of the communication between the remote operation server 20 and the remote operation device 10. Alternatively, the environment information control process element 23 may recognize the motion state of the work machine 40 according to the motion command based on a result of the communication between the remote operation server 20 and the work machine 40.

In the above-described embodiment, the environment data is transmitted from the work machine 40 to the remote operation device 10 through the remote operation server 20 (see STEP 410 STEP 214 STEP 106 in FIG. 4). However, as the other embodiments, the environment data may be transmitted from the work machine 40 to the remote operation device 10 through a radio communication base station.

In the above-described embodiment, the environment information control process may be performed on condition that the state of the reduction in the information amount of the environment information when the environment information control process is performed is output to the information output device 121, and the performance of the environment information control process is permitted through the input interface 110.

The communication resource allocation process element 22 may perform the communication resource allocation process by outputting the index value $z_i$ (or $x_i$ and $y_i$)

recognized by the state recognition element 21 to the specified output device and recognizing the state of allocating the communication resource to each of the plurality of remote operation devices 10, the communication resource being input through the specified input device. The specified output device and the specified input device may be included in the terminal device managed by a manager (supervisor), such as a smartphone, a tablet terminal or a notebook PC. The investigation and consideration, by a manager (supervisor), about the allocation of the communication resource to each of the plurality of remote operation devices 10 are assisted by the index value output to the specified output device. Using the specified input device enables the manager to appropriately allocate the communication resource to each remote operation device 10 according to the investigation result.

The environment data may include "internal environment data" indicating the motion state of the work machine 40 in addition to "external environment data" indicating external environment of the work machine 40. In this case, the data indicating angles detected by an angle sensor is acquired as the environment data, the angle sensor being provided to the work attachment 440 and configured to detect the angles representing postures of the boom and the arm. For example, in the case where a crawler crane serving as the work machine 40 performs a suspension work, the data indicating the angles of the boom and arm is omitted from the environment data, whereby the data amount of the environment data can be reduced.

REFERENCE SIGNS LIST

10 . . . Remote operation device, 20 . . . Remote operation server, 21 . . . State recognition element, 22 . . . Communication resource allocation process element, 23 . . . Environment information control process element, 40 . . . Work machine, 100 . . . Master control device, 110 . . . Input interface, 111 . . . Operating mechanism, 112 . . . Operation state detector, 120 . . . Output interface, 121 . . . Information output device, 122 . . . Wireless communication device, 400 . . . Slave control device, 401 . . . Environment recognition device, 402 . . . Wireless communication device, 440 . . . Work attachment (working mechanism)

The invention claimed is:

1. A remote operation server having a function of mutual communication with a plurality of work machines and each of a plurality of remote operation devices for remotely operating one work machine to be remotely operated among the plurality of work machines, the remote operation server comprising:
   a state recognition element configured to recognize an index value indicating a level of a remote operation skill of an operator of each of the plurality of remote operation devices and a degree of difficulty of a work content through the one work machine;
   a communication resource allocation process element configured to perform a communication resource allocation process for allocating, to each of the plurality of remote operation devices, a communication resource for mutual communication with the one work machine, based on the index value recognized by the state recognition element; and
   an environment information control process element configured to perform an environment information control process for adjusting each of a plurality of environment information factors in a different manner or pattern according to a difference in the communication resource allocated by the communication resource allocation process element so that a data amount of environment data is reduced, the environment information factor being output in an information output device included in the remote operation device and defining an information amount of environment information according to the environment data acquired by an environment recognition device included in the work machine, the environment data indicating an environment of the work machine, wherein
   the communication resource allocation process element performs the communication resource allocation process by outputting, to a specified output device, the index value recognized by the state recognition element and recognizing a state of allocating the communication resource for mutual communication with the one work machine to each of the plurality of remote operation devices, the communication resource being input through a specified input device.

2. The remote operation server according to claim 1, wherein
   the state recognition element recognizes an operation state of the remote operation device by the operator or a motion state of the work machine, and
   the environment information control process element performs the environment information control process to adjust each of the plurality of environment information factors in the different manner or pattern according to a difference in the operation state of the remote operation device or the motion state of the work machine that is recognized by the state recognition element.

3. The remote operation server according to claim 2, wherein
   the environment information control process element performs the environment information control process by classifying the plurality of environment information factors into a high environment information factor and a low environment information factor in the different manner or pattern according to the difference in the operation state of the remote operation device or the motion state of the work machine that is recognized by the state recognition element, such that a reduction in an information amount of the environment information according to the low environment information factor is greater than a reduction in an information amount of the environment information according to the high environment information factor.

4. The remote operation server according to claim 3, wherein
   the environment information control process element performs the environment information control process by classifying the plurality of environment information factors into the high environment information factor and the low environment information factor in the different manner or pattern such that one of the low environment information factors becomes the high environment information factor for another one of the low environment information factors.

5. The remote operation server according to claim 1, wherein
   the environment information control process element performs the environment information control process on condition that a communication speed of at least one of the remote operation device and the work machine falls below a reference value.

6. A remote operation system, comprising:
a plurality of work machines;
a plurality of remote operation devices for remotely operating one work machine to be remotely operated among the plurality of work machines; and
a remote operation server having a function of mutual communication with the plurality of work machines and each of the plurality of remote operation devices, wherein
the remote operation server comprises:
a state recognition element configured to recognize an index value indicating a level of a remote operation skill of an operator of each of the plurality of remote operation devices and a degree of difficulty of a work content through the one work machine;
a communication resource allocation process element configured to perform a communication resource allocation process for allocating, to each of the plurality of remote operation devices, a communication resource for mutual communication with the one work machine, based on the index value recognized by the state recognition element; and
an environment information control process element configured to perform an environment information control process for adjusting each of a plurality of environment information factors in a different manner or pattern according to a difference in the communication resource allocated by the communication resource allocation process element so that a data amount of environment data is reduced, the environment information factor being output in an information output device included in the remote operation device and defining an information amount of environment information according to the environment data acquired by an environment recognition device included in the work machine, the environment data indicating an environment of the work machine, wherein
the communication resource allocation process element performs the communication resource allocation process by outputting, to a specified output device, the index value recognized by the state recognition element and recognizing a state of allocating the communication resource for mutual communication with the one work machine to each of the plurality of remote operation devices, the communication resource being input through a specified input device.

* * * * *